United States Patent
Shuvalov

(10) Patent No.: US 11,824,442 B2
(45) Date of Patent: Nov. 21, 2023

(54) ERROR AMPLIFIER CIRCUITS FOR DC-DC CONVERTERS, DC-DC CONVERTERS AND CONTROLLERS

(71) Applicant: NXP USA, Inc., Austin, TX (US)

(72) Inventor: Denis Sergeevich Shuvalov, Munich (DE)

(73) Assignee: NXP USA, Inc., Eindhoven (NL)

( * ) Notice: Subject to any disclaimer, the term of this patent is extended or adjusted under 35 U.S.C. 154(b) by 234 days.

(21) Appl. No.: 17/341,644

(22) Filed: Jun. 8, 2021

(65) Prior Publication Data

US 2022/0038000 A1 Feb. 3, 2022

(30) Foreign Application Priority Data

Jul. 31, 2020 (EP) .................................... 20188823

(51) Int. Cl.
| | |
|---|---|
| *H02M 3/158* | (2006.01) |
| *H02M 1/00* | (2006.01) |
| *G05F 1/56* | (2006.01) |
| *H02M 1/08* | (2006.01) |

(52) U.S. Cl.
CPC ............ *H02M 3/158* (2013.01); *G05F 1/561* (2013.01); *H02M 1/0025* (2021.05); *H02M 1/08* (2013.01)

(58) Field of Classification Search
CPC ...... H02M 3/158; H02M 1/0025; H02M 1/08; G05F 1/561
See application file for complete search history.

(56) References Cited

U.S. PATENT DOCUMENTS

| | | |
|---|---|---|
| 9,882,473 B2 | 1/2018 | Arbetter |
| 9,948,185 B2 | 4/2018 | Unno |
| 10,008,928 B2 | 6/2018 | Bawa |

(Continued)

FOREIGN PATENT DOCUMENTS

| | | |
|---|---|---|
| CN | 103354419 A | 10/2013 |
| EP | 1783895 A2 | 5/2007 |

(Continued)

OTHER PUBLICATIONS

Attached Park Hyun Hee et al. foreign patent No. KR20100078322 translated with Espacenet. (Year: 2010).*

(Continued)

*Primary Examiner* — Shawki S Ismail
*Assistant Examiner* — Htet Z Kyaw

(57) ABSTRACT

An error amplifier circuit for a DC-DC power converter controller is disclosed for providing an amplified error signal to a switch control circuit, the circuit comprising an error amplifier first stage. The first stage comprises: a first input terminal for receiving a voltage proportional to an output voltage of the converter; an output node; a first operational transconductance amplifier in a first path between the input terminal and the output node and having a first input connected to the input terminal, a second input connectable to a reference signal, and an output connected to the output node; and a second, parallel, path comprising a series combination of an amplifier, a second OTA and a capacitor. The second OTA has an output connected to the capacitor, a first input connected to an output of the amplifier, and a second input connected to the output. Associated control circuits, controllers and converters are also disclosed.

14 Claims, 7 Drawing Sheets

(56) References Cited

U.S. PATENT DOCUMENTS

| | | | |
|---|---|---|---|
| 10,250,128 | B2 | 4/2019 | Unno et al. |
| 11,099,589 | B1* | 8/2021 | Laur .................... H02M 3/156 |
| 2004/0169550 | A1* | 9/2004 | Perrier .................... G05F 1/575 |
| | | | 327/541 |
| 2009/0140803 | A1* | 6/2009 | Aram ........................ H03F 1/42 |
| | | | 330/98 |
| 2017/0358984 | A1 | 12/2017 | Unno |
| 2020/0195140 | A1 | 6/2020 | Arbetter |

FOREIGN PATENT DOCUMENTS

| | | | |
|---|---|---|---|
| EP | 1783895 A3 | 5/2007 | |
| KR | 2010-0078322 A | 7/2010 | |
| KR | 20100078322 * | 7/2010 | .............. H02M 1/42 |

OTHER PUBLICATIONS

Fan et al., "On-Chip Type III Compensator by Using Constant-Gm OTAs and Capacitor-Multipliers for Fully Integrated Buck Converters," 2016 13th IEEE International Conference on Solid-State and Integrated Circuit Technology (ICSICT), Oct. 25-28, 2016, 3 pages.

Yuan et al., "Pseudo-Type-III Compensation Integrated in a Voltage-Mode Buck Regulator," IEEE Transactions on Circuits and Systems II: Express Briefs ( vol. 61, Issue: 12, Dec. 2014), 5 pages.

Hong et al., "High Area-Efficient DC-DC Converter With High Reliability Using Time-Mode Miller Compensation (TMMC)," IEEE Journal of Solid-State Circuits ( vol. 48, Issue: 10, Oct. 2013), 12 pages.

Bawa et al., "Switched-Capacitor Filter based Type-III Compensation for switched-mode Buck Converters," Proceedings of the IEEE 2013 Custom Integrated Circuits Conference, Nov. 11, 2013, 4 pages.

Wu et al., "Area- and Power-Efficient Monolithic Buck Converters With Pseudo-Type III Compensation," IEEE Journal of Solid-State Circuits 45 (2010), Jul. 23, 2010, pp. 1446-1455.

Gregoire et al., "A Sub 1-V Constant Gm—C Switched-Capacitor Current Source," IEEE Transactions on Circuits and Systems II: Express Briefs ( vol. 54, Issue: 3, Mar. 2007), 5 pages.

Park et al., "A DC-DC Converter for a Fully Integrated PID Compensator With a Single Capacitor", IEEE Transactions on Circuits and Systems—II: Express Briefs, Aug. 1, 2014, vol. 61, No. 8, pp. 629-633.

* cited by examiner

ERROR AMPLIFIER CIRCUITS FOR DC-DC CONVERTERS, DC-DC CONVERTERS AND CONTROLLERS

FIELD

This disclosure relates to DC-DC converters, controllers therefor, and error amplifier circuits therefor.

BACKGROUND

DC-DC converters are important in a wide range of applications, particularly where power is required to be provided from a relatively high voltage, such as a mains supply or a car battery, to low voltage devices such as computing and communications devices, or automobile electronic devices. Furthermore, they are also becoming increasingly important in applications requiring efficient power delivery, even when a large step-down (or step-up) in voltage is not necessarily involved.

An example of a typical synchronous DC-DC buck converter is shown in FIG. 1. In this example, the converter 100 converts an input voltage Vin to an output voltage Vout. The converter includes a pair of switches SH and SL connected in series between the input voltage Vin and a ground. The node Vs therebetween is switched alternately between the input voltage and ground with a well-defined duty cycle, by means of a control circuit 120 which forms part of a controller 110 and controls the pair of switches. An inductor L is connected between the node Vs and an output Vout. An output capacitor Cout is connected between the output and ground, and a load, in this case shown as a resistive load RL, may be connected between the output and a ground.

As will be familiar to the skilled person, in this example, in steady state the output voltage Vout is generally related to the input voltage according to the "high-low" duty cycle of the node Vs.

A feedback path 105 is typically provided between the output of the DC-DC converter and the control circuit 120. The feedback circuit typically includes an error amplifier circuit 200 which determines an error between the actual output Vout and a desired or reference output Vref and amplifies the error to provide a signal Vea, which is provided to the control circuit 120. However, changes in the load RL cause perturbations on the output voltage: in some applications it may be important to minimise this perturbation and to control the stability of the transient response, through the design of the error amplifier.

As will be discussed in more detail below, there may be a delay between the onset of a transient caused for instance by a change in the load, and the controller adapting the DC-DC converter in response to the transient. Over recent years there has been a trend to increase the switching frequency of DC-DC converters; the delay may interfere with the feedback response and create instabilities in the control. Various error amplifier circuits have been developed to provide protection against the effects of the delay and to avoid instabilities in the control. These circuits generally are generally described as so-called "type II compensators" or PI (proportional-integral) type circuits and so-called "type III compensators", or PID (proportional-integral-derivative) circuits. However, conventionally such circuits tend to require passive components, which may be bulky and require dedicated "trimming" (that is to say manual adjustment, or value selection, depending on the implementation). It would be desirable to provide an error amplifier circuit which is straightforward to implement and requires a reduced number, or even zero, trimming components.

SUMMARY

According to a first aspect there is provided an error amplifier circuit for a DC-DC power converter controller and configured to provide a amplified error signal to a switch control circuit, the error amplifier circuit comprising an error amplifier first stage; the error amplifier first stage comprising: a first input terminal (V'out) for receiving a voltage proportional to an output voltage of the DC-DC converter; an output node ($V_A$); a first operational transconductance amplifier, OTA, in a first path between the input terminal and the output node and having a first input connected to the input terminal, a second input connectable to a reference signal, and an output connected to the output node; and a second path between the input terminal and the output node and comprising a series combination of a first amplifier, a second OTA and a first capacitor, wherein the second OTA has an output connected to the first capacitor, a first input connected to an output of the first amplifier, and a second input connected to the output of the second OTA. Thereby a circuit has been provided which can act as a type II compensator or as a first stage of a type III compensator. Operationally, this is equivalent to a PI (proportional-integral) control circuit, and may form part of type III compensator which is operationally equivalent to a PID (proportional-integral-derivative) control circuit.

Conventional error amplifiers, for which the frequency response is reliant on passive resistors, either external or internal, typically include many trimming components, resistors and capacitances, to adapt the frequency response to a chosen range of switching frequency and to the value of an external inductance L (in case of voltage mode control) or a load RL (in case of current mode control) and capacitance Cout (in both cases), which might be allowed to be selected (from within a certain range) for the specific DC-DC converter application. An error amplifier circuit according to the present disclosure does not require any passive resistors, either external or internal; instead it is reliant on OTAs. In particular, poles and zeros of the error amplifier transfer function may by defined through the ratios between the OTA transconductances and compensation capacitances, rather than by defining separate trimming for each pole or zero. The transconductances, or transconductance-to-capacitance ratios, are suitable to be adjusted for different switching frequencies using a central trimming component. As a result, such an error amplifier may only require a single trimming component to fine tune the frequency response of the error amplifier circuit in respect to the value of an external inductance L or a load RL and capacitance Cout. These possible benefits may be particularly convenient for the design of a control circuit which requires little or no customisation for different specific applications.

In one or more embodiments, the first stage output node is configured to provide the amplified error signal to the switch control circuit. Such embodiments are effective as type II compensators or PI controllers.

In one or more other embodiments, the error amplifier circuit further comprises an error amplifier second stage, having an input node being the output node of the first stage error amplifier, and a second stage output node wherein the second stage output node is configured to provide the amplified error signal to the switch control circuit. Such embodiments are effective as type III compensators, or PID controllers.

In one or more embodiments the second stage error amplifier comprises: a first path comprising a third OTA, wherein the third OTA has an output connected to the output node of the second stage and an input connected to the output node of the first stage; and a second feedback path in parallel with the first path and comprising a series arrangement of a second amplifier, a fourth OTA, and a second capacitor, wherein the fourth OTA has an output connected to the compensation capacitor, a first input connected to an output of the second amplifier, and a second input connected to the output of the fourth OTA. Again by relying on OTAs, trimming resistors may be reduced or eliminated.

In one or more embodiments, the error amplifier circuit further comprises an output capacitor connected between the output node and ground.

The error amplifier circuit may further comprise a resistive voltage divider comprising two resistors (R1, R2) connected in series and configured to be connected between an output of the DC-DC converter (Vout) and ground, the node between the two resistors being connected to the first input terminal (V'out).

According to a second aspect of the present disclosure there is provided a control circuit for a DC-DC converter and comprising an error amplifier circuit as claimed in any preceding claim, and control logic for controlling a power switch of the DC-DC converter, wherein the power switch is configured to transmit power by means of a switched element. The switched element may be an inductive element or one or more capacitors.

The control circuit may be integrated as part of an integrated circuit. The first capacitor may be monolithically integrated in the integrated circuit, as may the second capacitor, and/or the output capacitor. It may be, or may be comprised in, a single-chip controller for a DC-DC converter.

The control circuit may further comprise at least one switch driver configured to drive a DC-DC converter switch with a pulse width modulated, PWM, signal.

According to a third aspect of the present disclosure there is provided a DC-DC converter comprising an error amplifier circuit or an integrated circuit, and further comprising at least one switch and a switched inductive element. In other embodiments the switched element may be one or more capacitors instead of an inductive element.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

Figure 1:
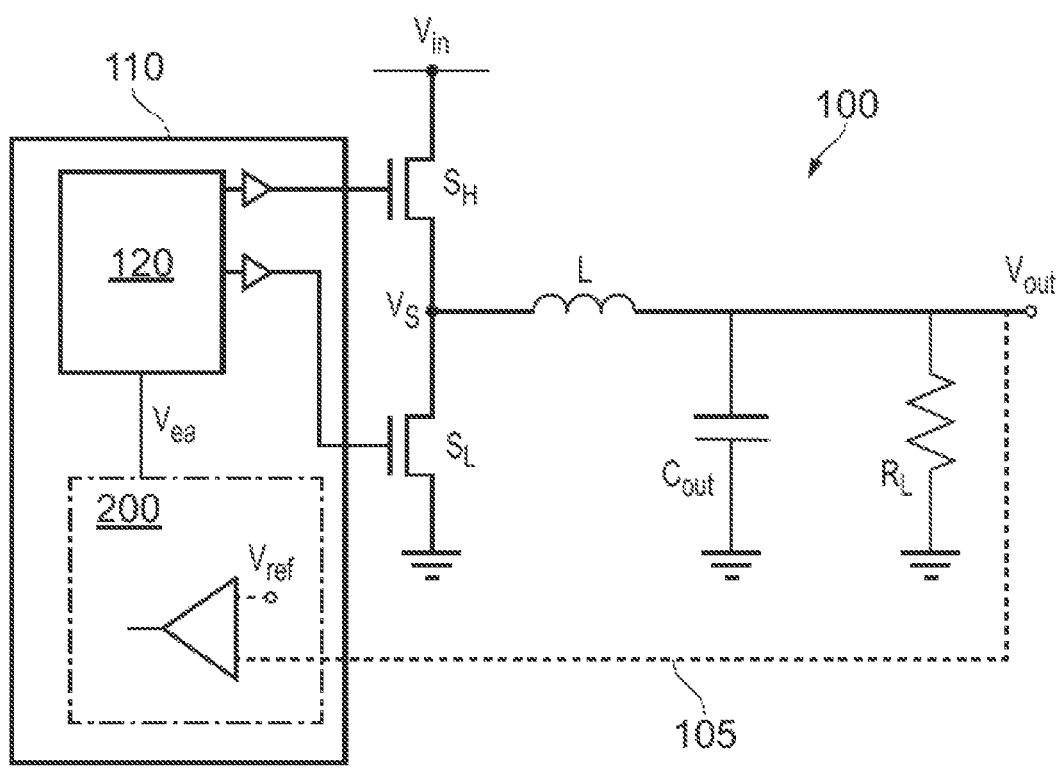
FIG. 1 shows a simplified DC-DC buck converter.

It should be noted that the Figures are diagrammatic and not necessarily drawn to scale. Relative dimensions and proportions of parts of these Figures may be shown exaggerated or reduced in size, for the sake of clarity and convenience in the drawings. The same reference signs are generally used to refer to corresponding or similar features in modified and different embodiments

DETAILED DESCRIPTION OF EMBODIMENTS

Various embodiments will be described below, which utilize operational transconductance amplifiers as the main components of novel topologies for error amplifiers. The OTAs, and in particular their transconductances, replace conventionally used passive resistors, and are implemented in novel architectures or topologies, for both type III and type II compensation error amplifiers.

Figure 2:
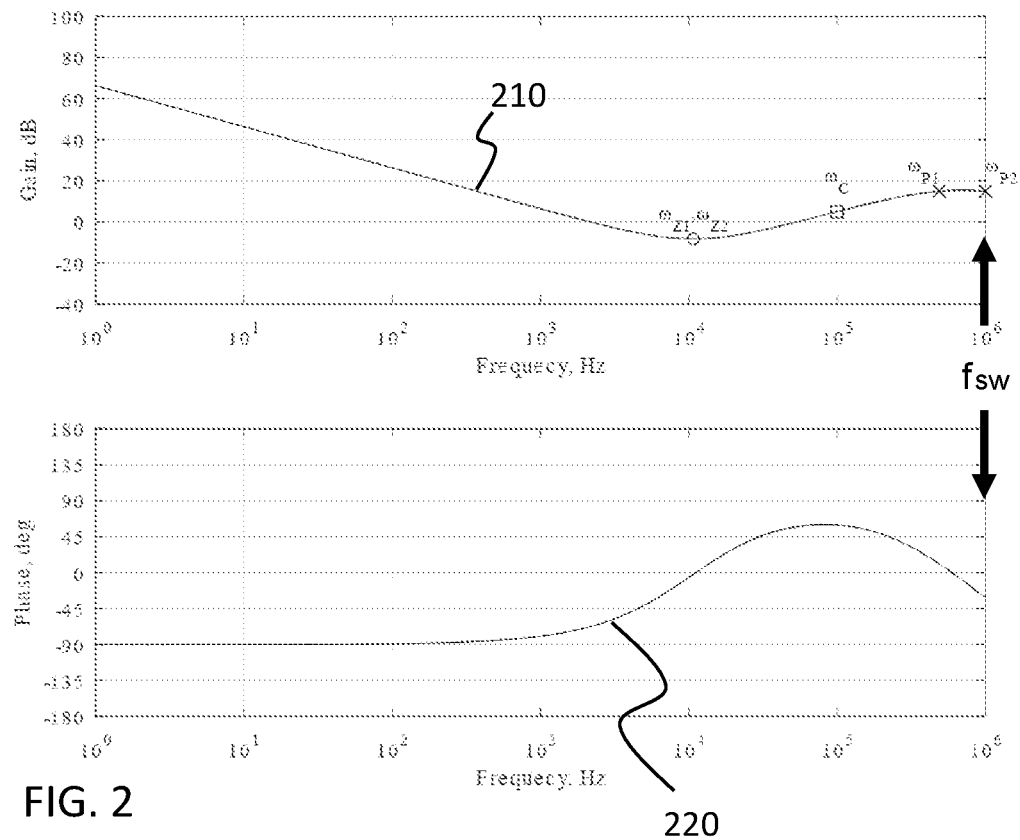
FIG. 2 shows the frequency response of gain and phase of a conventional type III error amplifier circuit

Considering FIG. 2, this shows the gain and phase response of a typical error amplifier providing type III compensation. The figure shows various frequencies associated with poles and zeros of the compensated error amplifier. The skilled person will recall that poles corresponds to frequencies at which the transfer function approaches infinity, and zeros correspond to frequencies at which the transfer function approaches zero.

The cross-over frequency, $\omega c$, is defined as the frequency at which the open-loop gain of the converter control loop is unity. In conventional designs of DC-DC converters, the crossover frequency is typically set to about one tenth to about one fifth of the switching frequency fsw. So for an example design switching frequency of 1 MHz, the crossover frequency would be set to 100 kHz (and up to perhaps 200 kHz for more aggressive designs). Good stability may be then achieved by appropriate choice of the poles and zeros: typically both zeros $\omega z1$ and $\omega z2$ are set to be close together to compensate the resonance of the external LC filter ($\omega LC=(LC)^{-0.5}$), under voltage mode control, which may be approximately 5 kHz, (or lower, for smaller output ripple), to 25 kHz. As shown here, $\omega c$ is 100 kHz. The ratio between $\omega c$ and $\omega LC$ is preferably in a range of about 4 to about 20 (or higher, for smaller output ripple). The first non-dominant pole $\omega p1$ may be arranged to be 50% of the switching frequency fsw, or 500 kHz in this example, to ensure sufficient gain margin. The person skilled in the art of feedback control systems will be aware that it is generally desirable to ensure that the gain at a phase of 180°, known as gain margin, should be no more than −6 dB, to ensure stable loop response. The remaining non-dominant pole or poles can be used to compensate left-half plane zero (LHP zero) created by the equivalent series resistance (ESR) of the output capacitor, if it below the switching frequency, or to set the phase margin into a range between about 50° and about 70° typically considered optimum for transient response. Again, the person skilled in the art of feedback control systems will be aware that it is generally desirable to ensure that the phase at the cross-over frequency is not too close to 0°—which could lead to instability. Thus, this figure corresponds to the frequency response of the gain—on the upper plot 210, and the phase—on the lower plot 220, of a conventional type III compensator, using passive resistors for trimming. The skilled person will be familiar with the phase boost, which in this example centres on the frequency 100 kHz, in the phase curve 220, along with the expected gain curve 210 which has a maximum around the switching frequency, a positive slope below that and around the frequencies having the phase boost.

Figure 3:
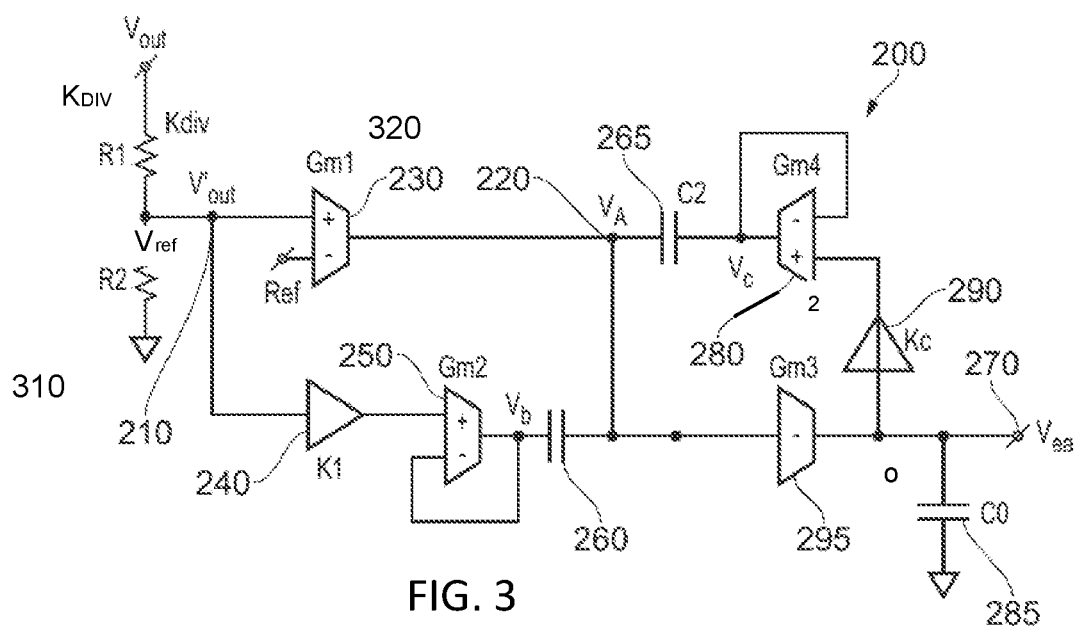
FIG. 3 shows a circuit diagram of a type III error amplifier circuit according to one or more embodiments.

FIG. 3 shows a circuit diagram of a type III compensated error amplifier circuit 200, which is also referred to hereinbelow as a "type III compensator", according to one or more embodiments of the present disclosure. The skilled person will be familiar that a type III compensator is a form of PID (proportional-integral-derivative) amplifier circuit. The error amplifier circuit includes a first input terminal V'out 310, which may be directly connected to the output voltage Vout of a DC-DC converter, or may be, as shown, a scaled version of the output voltage scaled by the factor $K_{DIV}=R1/(R1+R2)$ according to a potential divider R1, R2.

The circuit may be viewed, from one perspective, as an error amplifier having two stages with a node 320 $V_A$ therebetween. The first stage has a first operational transconductance amplifier (OTA) 230, in a first path between the input terminal and the node $V_A$. OTA 230 has a transconductance of Gm1. One input of the OTA is connected to the first input terminal, and the other input is connected to a reference voltage Vref. The first stage of the error amplifier circuit amplifies the error between the voltage at the first input terminal and this reference voltage. The output of the OTA is connected to the node $V_A$.

In parallel with the OTA is a second path, which provides feed-forward: this path comprises an amplifier 240, with gain $K_1$, connected between the first input terminal and a first input of a second operational transconductance amplifier 250 having transconductance Gm2. This OTA 250 is configured as a unity gain buffer by connecting its output, at Vb, back to its second input. The feedforward path is completed by a DC-blocking feed-forward capacitance C1, which may be implemented as a first compensation capacitor, shown at 260, connected between the output of the OTA 250 and the node $V_A$. The first compensation capacitor C1 typically has a capacitance between about few tenths and few hundred pF. Again viewed from the perspective of a two-stage error amplifier, the second stage connects the node $V_A$ to the output node 270 at which is provided the output Vea of the error amplifier circuit. The second stage again comprises two parallel paths. The first path between the node $V_A$ and the output node 270 is provided by a third OTA 295 being a single-input OTA have transconductance Gm3. The skilled person will appreciate that this can be implemented in a variety of ways, such as a common source MOSFET, or a differential input OTA have a voltage-biased positive input. The second path, that is to say the feedback path, comprises a second capacitor 265, C2, which may be implemented as a second compensation capacitor connected between the node $V_A$ and the output of a further OTA 280 having transconductance Gm4. The second compensation capacitor typically has a capacitance between about few tenths and a few hundred pF. One input of the OTA 280 is connected to the output node 270 Vea via a second amplifier 290, with gain $K_2$, and its second input is connected to its output. The second amplifier has its input connected to the output node 270 and its output connected to the OTA 280.

A capacitor Co 285 is connected between the output node 270 Vea and ground. This capacitor typically has a relatively low capacitance, compared with the first and second capacitors, and may be of the order of a few pF. This is provided in order to define the frequency of a high frequency pole, usually located at half the switching frequency, and to improved gain margin of the controller regulation loop. Also, it improves the immunity of the circuit to any kickback noise from the controller, such as from the comparator in the PWM modulator.

The circuit of FIG. 3 can be analysed analytically, which results in a third order complex transfer function H(s). Generally, OTAs have finite output resistances, which fact restricts the DC gain of the error amplifier and makes the integrator lossy. However, for analysing the circuits of the present disclosure, these output resistances may be assumed infinitely large and thus the integrator may be treated as an ideal one with infinite DC gain and a first dominant pole at 0 Hz. The transfer function of the circuit shown in FIG. 2 then becomes, in factorized form with inverted zero:

$$H(s) = -\frac{H_{\omega Z1}\left(\frac{\omega_{Z1}}{S}+1\right)\left(\frac{S}{\omega_{Z2}}+1\right)}{\left(\frac{S}{\omega_{P1}}+1\right)\left(\frac{S}{\omega_{P2}}+1\right)}, \quad (1)$$

where $$H_{\omega Z1} = \frac{G_{m1}}{G_{m4}}\frac{K_{DIV}}{K_2}. \quad (2)$$

is the gain of the error amplifier at the frequency of the first zero, $\omega_{Z1}$. The first zero is created by the finite output impedance of the OTA Gm4 which configured as a unity gain buffer, and which is in series with compensation capacitor $C_2$:

$$\omega_{Z1} = -\left(\frac{Gm4}{C_2}\right). \quad (3)$$

The second zero is created by the feedforward path through Gm2 250:

$$\omega_{Z2} = -\left(\frac{Gm_1}{C1}\right)\frac{1}{\left(\frac{Gm_1}{Gm_2}+K1\right)} \quad (4)$$

The circuit has a dominant pole $\omega p0$ at 0 Hz, and two non-dominant poles $\omega p1$, $\omega p2$:

$$\omega_{P1} \approx -\left(\frac{Gm_2}{C1}\right), \quad (5)$$

and $$\omega_{P2} \approx -\left(\frac{Gm_3}{C_0}\right)\frac{Gm_4 K_2}{(Gm_2+Gm_4)}. \quad (6)$$

The cross-over frequency of the DC-DC converter control loop, including the error amplifier a disclosed herein, can be found to be:

$$\omega c \approx H_{\omega Z1}\omega_{Z1}K_{PWM} = \left(\frac{Gm1}{C2}\right)\cdot\frac{K_{DIV}\cdot K_{PWM}}{K_2}, \quad (7)$$

where $K_{PWM}$ is the gain of the PWM modulator in the convertor switch control circuit when operating in voltage control mode. (Auxiliary amplifier 200 with gain $K_2$ has the same effect as a capacitance multiplier, and is one of the known approaches used to reduce a size of $C_2$, and might be used to decrease the required layout area).

It can be shown that, for the circuit shown in FIG. 2, the distance between the first non-dominant pole and the second zero is:

$$\omega_{P1}/\omega_{Z2} = 1 + \frac{Gm_2}{Gm_1} \cdot K_1, \qquad (8)$$

which, in some practical designs, should be in a preferred range of about 20 to about 100. (As mentioned above, resonance of the external LC filter ($\omega LC = (LC)^{-0.5}$), may be approximately 5 kHz to 25 kHz, and the ratio between we and $\omega LC$ is preferably in a range of about 4 to about 20. $\omega p1/\omega z2$ is approximately times this ratio—that is to say approximately 20 to approximately 100.) For any practical design, the ratios between the transconductances should not be too high, that is to say Gm2/Gm1 should not be higher than, say, about 10, to avoid layout area and consumption overheads, as well as Gm2/Gm1 ratio accuracy degradation due to mismatches. The amplifier 240 with gain $K_1$ is useful in order to avoid impracticably high ratios Gm2/Gm1 between the OTAs 230 and 250. Without this amplifier, a high ratio between Gm2 and Gm1 would be required in order to ensure that $\omega p1/\omega z2$ is in the preferred range of about to about 100. Thereby it can be assured that the error amplifier design is not too power hungry, and that the circuit is reproducibly manufacturable taking into account process variations, with sufficient accuracy.

In a similar way it can be shown that the distance, or frequency separation, between the cross-over frequency and the first zero is:

$$\omega_C/\omega_{Z1} = \left(\frac{Gm_1}{Gm_4}\right) \cdot \frac{K_{DIV} K_{PWM}}{K_2}, \qquad (9)$$

and, in some practical designs, this should be in a preferred range of about 4 to about 20. For instance, for the same practical design, $K_{DIV} \cdot K_{PWM}$ is around 10, so a desired $\omega c/\omega z1$ in a range of between about 4 and about 20 could be achieved by a proper selection of the ratio Gm1/Gm4, with $K_2 \geq 1$, which might be used to decrease the required value of the compensation capacitor $C_2$.

When the converter is designed to operate at a particular switching frequency, the positions of the cross-over frequency and the non-dominant poles are defined linked to the switching frequency. The positions of the zeros are, in contrast, typically chosen at the resonance frequency created by the external inductor L and output capacitor Cout. To enable the amplifier circuit to be usable with a wide range of external inductors and/or capacitances, it may be required to be able to adjust, or trim, the position of the zeros without significantly affecting the positions of the crossover frequency and non-dominant poles. In the above equations (8) and (9), $K_{DIV}$ and $K_{PWM}$ may be considered as fixed design parameters; moreover, Gm1 has an opposite effect on $\omega c/\omega z1$ and $\omega p1/\omega z2$ and hence should be fixed as well. Because of this, the appropriate design parameters to adjust, in order to change the (frequency) positions of the zeros $\omega z1$ and $\omega z2$, at the LC resonance $\omega_{LC}$, are Gm2·$K_1$ and Gm4·$K_2$, either in pairs, or separately. The skilled person will appreciate that these parameters can be concurrently changed within one trimming; that is to say, by changing the value Gm2, and/or the value of $K_1$ reciprocal to the change in Gm4 and/or $K_2$.

It will also be appreciated that the circuit of FIG. 2 makes extensive use of transconductors, to replace passive resistors, and the crossover frequency, poles and zeros, and transfers functions shown in equations 3 to 7 are proportional to the ratio Gm/C, which may thereby reduce the amount of trimming required. In particular it is noteworthy, that it is not necessary to adjust any networks of other components (such as resistance in a resistance network), as is generally required in most prior art error amplifiers. In particular, whereas the process and temperature variation effect of integrated capacitors is usually small, that for integrated passive resistors is usually large. Although usage of constant Gm bias (with a trimmed and zero temperature coefficient (ZTC) passive resistor as a central trimming component) will stabilize Gm/C and the resulting loop frequency response of DC-DC converter utilizing the error amplifier shown in FIG. 2, at a specific switching frequency, to enable the circuit to be re-used in other applications at other switching frequencies, trimming of constant Gm bias should cover all the allowed range of switching frequencies. It is therefore preferred to use a constant Gm/C bias, by which the frequency loop response of the DC-DC converter will be auto-scaled with respect to switching frequency $f_{SW}$; this may result that the error amplifier can be used over a wide range of switching frequencies, without dedicated trimming of the central trimming component—i.e. without explicit trimming of Gm of all the transconductances.

In passing it should be noted that there are known circuit solutions for automatically adjusting and keeping constant transconductance-to-capacitance ratio in respect to the switching frequency, which are readily applicable to embodiments of the present disclosure, to omit the central trimming component.

Figure 4:
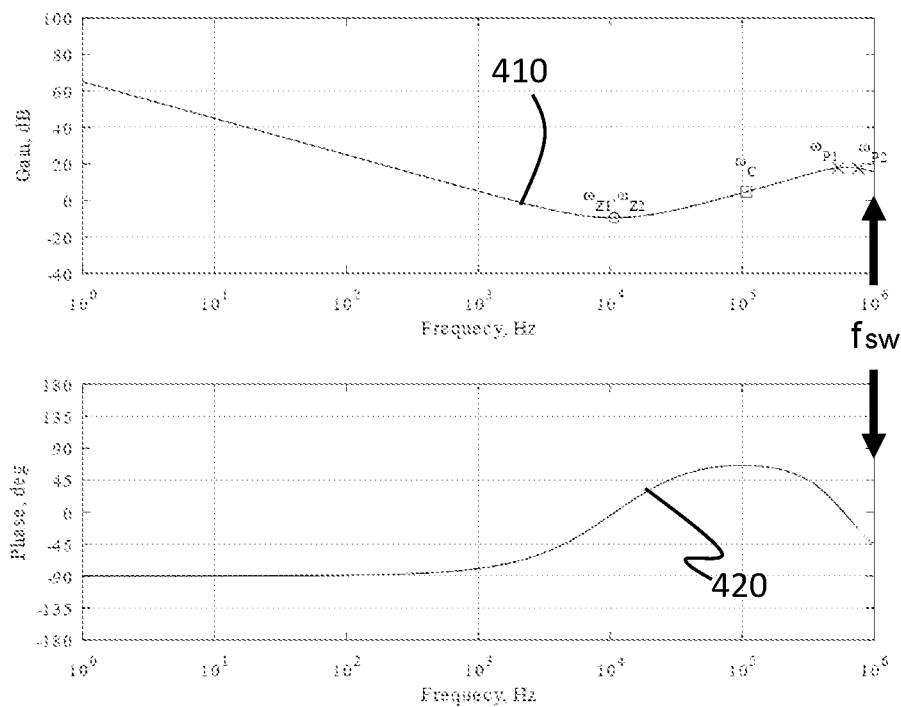
FIG. 4 shows the frequency response of gain and phase for a type III error amplifier circuit according to one or more embodiments.

FIG. 4 shows the frequency response of gain, at 410, and phase at 420 of an error amplifier comprising transconductance amplifiers as shown in FIG. 3 and analysed above. It is immediately apparent that the gain has a broadly similar shape to that of the conventional compensator. That is to say a local maxima around (or in this case just below) the normal switching frequency of 1 MHz, with a positive slope for frequencies below that and around the phase boost centre frequency of approximately one 100 kHz, and a negative slope at lower frequencies (i.e. the gain decreases with increasing frequency), in this example below 10 kHz.

Figure 5:
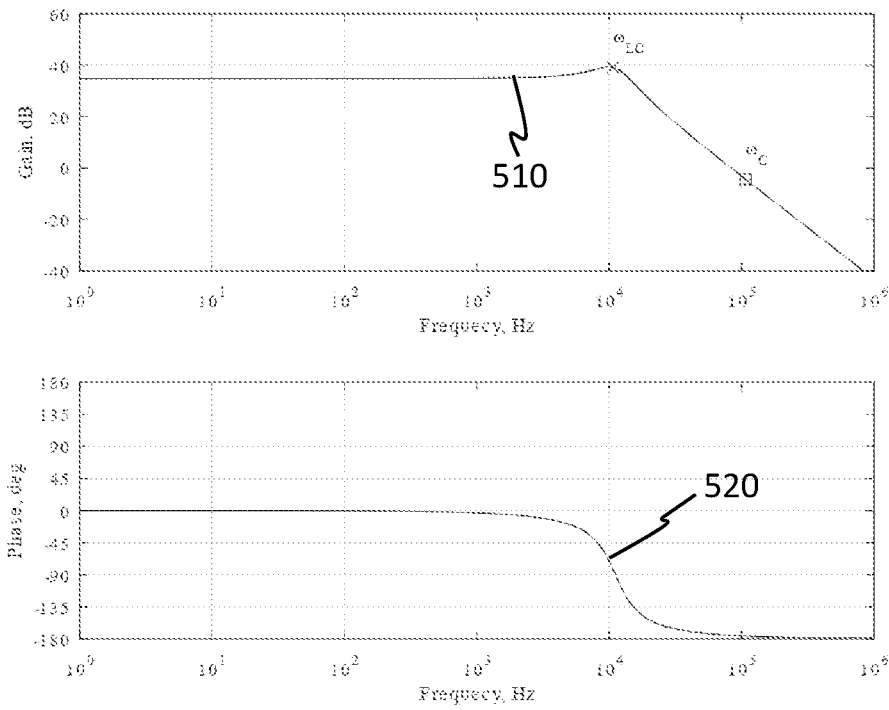
FIG. 5 shows a typical frequency response of a PWM control loop (apart from the error amplifier) operating under voltage mode control.

FIG. 5 shows a typical frequency response of gain, at 510, and phase, at 520, of a PWM control loop (apart from the error amplifier), such as shown at 120 in FIG. 1, operating under voltage mode control. It will be noted that the controller's response is not flat, over the frequency range of interest, due to the order low-pass filter response of LC and LC resonance being damped by resistances of load $R_L$, of switches $S_H$ and $S_L$ and by series parasitic resistance of L (not shown). Thus the PWM controller design should be taken into account, along with the error amplifier, when designing the complete loop response of the DC-DC control.

Figure 6:
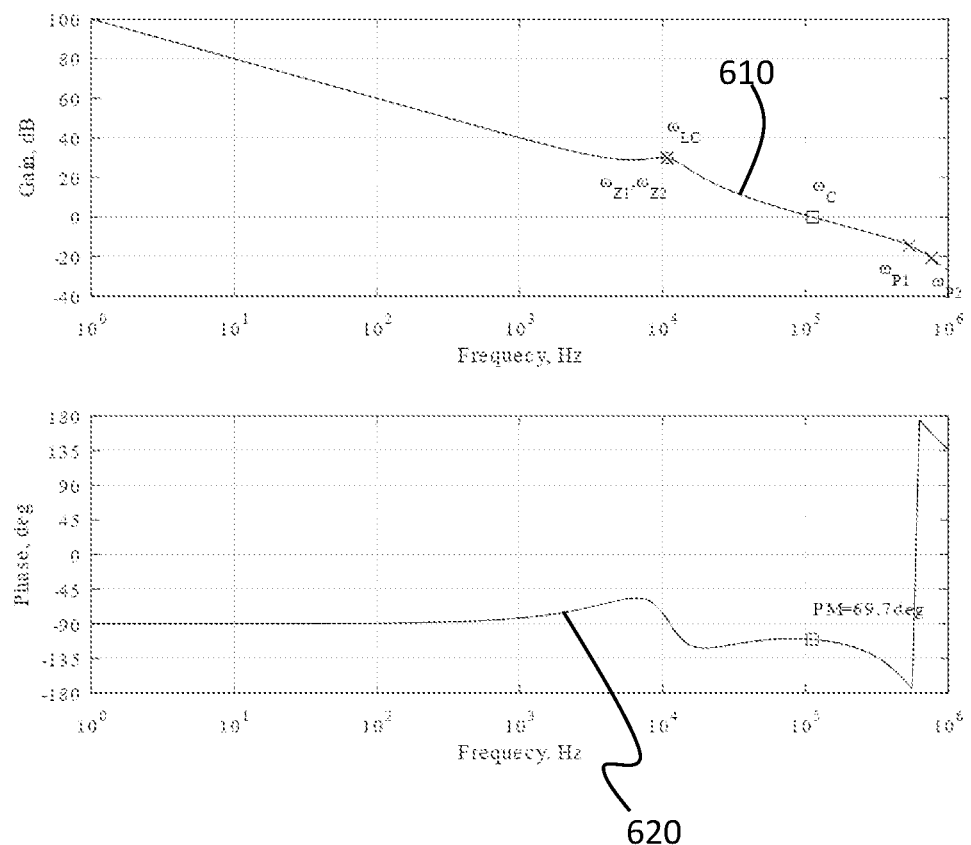
FIG. 6 shows the loop response of a DC-DC converter operating under voltage mode control and having a type III error amplifier circuit as shown in FIG. 2.

An example of the loop response—that is to say, the error amplifier response multiplied by the rest of the PWM control loop response, is shown in FIG. 6, which depicts at 610 the gain and at 620 the phase response.

As discussed above, the compensated error amplifier circuit shown in FIG. 2 provides for so-called type III compensation including two zeros and at least three poles.

This form of compensation is particularly appropriate for DC-DC converters operating in voltage control mode with input voltage feed-forward PWM control, improving the stability of both $K_{PWM}$ and the frequency characteristic. Furthermore, the susceptibility of the converter to power supply variation and noise is reduced.

The skilled person will be familiar with the fact that for current-mode control of DC-DC converters, type III compensation may not be required, and type II compensators may perform adequately. Type II compensation is inherently simpler than type III compensation; circuits of this type typically have a single zero and two poles.

Figure 7:
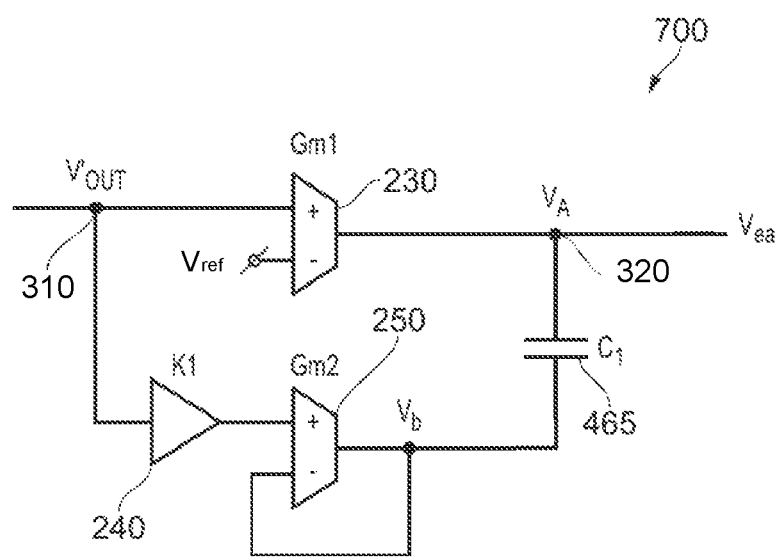
FIG. 7 shows a circuit diagram of a type II error amplifier circuit according to one or more embodiments.

FIG. 7 shows a type II compensator, or error amplifier circuit 700, according to the present disclosure. The skilled person will appreciate that a type-II compensator is generally equivalent to a PI (proportional-integral) circuit. In general terms, the circuit is the same as the first amplifier stage of the type III compensator: the circuit has a first operational transconductance amplifier (OTA) 230, in a first path between the input terminal and the node $V_A$. In the case of this type II compensation the node $V_A$ 320 is directly connected to the output Vea of the circuit. OTA 230 has a transconductance of Gm1. One input of the OTA is connected to the first input terminal V'out 310, and the other input is connected to a reference voltage Vref. The error amplifier circuit amplifies the error between the voltage at first input terminal and this reference voltage. The output of the OTA is connected to the node $V_A$.

In parallel with the OTA is a second path, which provides a feed-forward: this path comprises an amplifier 240 with gain $K_1$, connected between the first input terminal and a first input of a second operational transconductance amplifier 250, having transconductance Gm2. This OTA 250 is configured as a unity-gain buffer OTA by connecting its output, at Vb, back to its second input. The feedforward path is completed by a capacitance C1, shown at 465, connected between the output of the OTA 250 and the node $V_A$.

It will be noted that in the type III compensator circuit of FIG. 3, in which the capacitance corresponding to C1 is a DC blocking feedforward capacitor C1, the compensation capacitor C2 265 is located in the second stage. However, in the type II compensator shown in FIG. 6, the first capacitor C1 fulfils both roles—that is to say it acts both as the compensation capacitor Cc and feedforward capacitor C1.

Analytical analysis of this circuit is similar to that of the type III error amplifier: the second order transfer function H(s) of an ideal integrator, having its first dominant pole at 0 Hz can be given in factorized form with inverted zero:

$$H(s) = -\frac{H_{\omega_{Z1}}\left(\frac{\omega_{Z1}}{S} + 1\right)}{\left(\frac{S}{\omega_{P1}} + 1\right)}, \quad (10)$$

where $$H_{\omega_{Z1}} \approx K_{DIV}\left(\frac{Gm1}{Gm2} + K_1\right) \quad (11)$$

is the gain of the error amplifier at the frequency of the first zero ωz1. Frequencies of the first zero ωz1 and pole ωp1 are given by:

$$\omega_{Z1} \approx -\left(\frac{Gm1}{C1}\right) \cdot \frac{1}{\left(\frac{Gm_1}{Gm_2} + K1\right)}, \quad (12)$$

$$\omega_{P0} \approx -\frac{Gm2}{C0} \quad (13)$$

Typically, type II compensation is designed in a way to compensate within ωz1 a pole, which is created by the output impedance of DC-DC converter at maximum load condition. The frequency of this pole is defined by the expression $$\omega_{RC} = -\frac{1}{C_{out}}\left(\frac{1}{R_{out}} + \frac{1}{K_m R_i}\right), \quad (14)$$

where Km and Ri depend on the specific DC-DC converter: Km is the gain of the modulator of the current mode controlled converter, and Ri is the linear gain of the current sensing network. The skilled person will appreciate that for current mode control, the current may be sensed in one or more of various locations within the circuit including at the switch node, the input current, the output current etc. The value of Ri will be dependent on the specific architecture used.

When ωz1 is exactly at the position of $\omega_{RC}$, the cross-over frequency of the converter controller transfer function is defined through:

$$\omega_C \approx H_{\omega_{Z1}} \cdot \omega_{Z1} \cdot K_{MOD} = \left(\frac{Gm1}{C1}\right) \cdot K_{DIV} K_{MOD} \quad (15)$$

where the gain, $K_{MOD}$, of the DC-DC power stage is defined by the expression:

$$K_{MOD} = \frac{R_{out}}{R_i} \frac{1}{1 + \frac{R_{out}}{K_m R_i}} \quad (16)$$

and where $K_{DIV}$ is the gain of the resistive potential divider.

So, the distance, that is to say the separation in frequency, between the cross-over frequency and the first zero is $$\omega_C/\omega_{Z1} = K_{DIV} K_{MOD}\left(\frac{Gm_1}{Gm_2} + K_1\right). \quad (17)$$

In the above equation (17), Gm1, $K_{DIV}$ and $K_{MOD}$ should be considered as fixed design parameters, defining ωc. Gm2 is also not a suitable parameter because it affects the position of the non-dominant pole ωp1. Because of this, appropriate design parameters to adjust the position of the zero in respect to the pole, which is created by the selectable output resistance Rout and output capacitance Cout of the DC-DC converter, is K1, along with a fixed Gm1/Gm2 ratio. As in the type III converter embodiments, the separation ωc/ωz1 does not dictate an impractically high ratio Gm1/Gm2.

Finally, in this circuit, the frequency of ωp1 is typically designed to compensate either the equivalent series resistance (ESR) of the output capacitor if that is below fsw, or at half the switching frequency fsw, at which frequency a double pole may occur due to the sampling effect of the current control loop.

Figure 8:
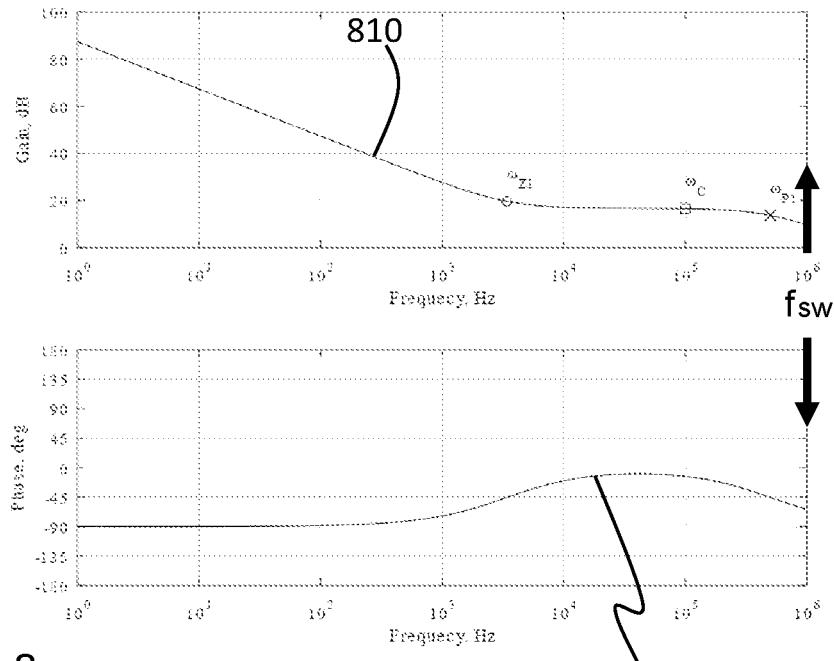
FIG. 8 shows the frequency response of gain and phase for a type III error amplifier circuit according to one or more embodiments.

FIG. 8 shows the gain, at 810, and phase response at 820 of an error amplifier comprising transconductance amplifiers as shown in FIG. 7 and analysed above. It is immediately apparent that the gain has a broadly similar shape to that of the conventional compensator. That is to say a gain plateau and phase boost around the cross-over frequency.

Figure 9:
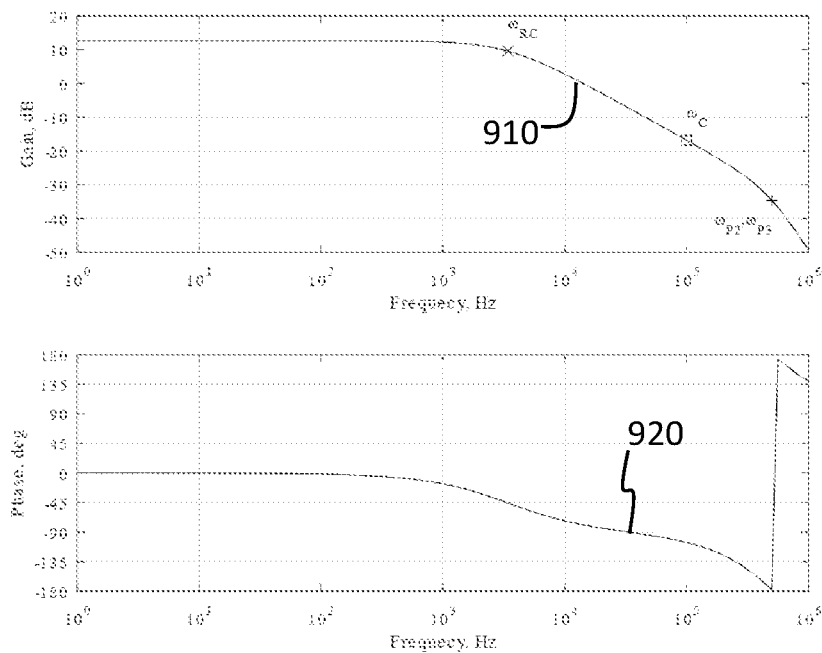
FIG. 9 shows a typical frequency response of a PWM control loop (apart from the error amplifier) operating under current mode control.

FIG. 9 shows a typical gain, at 910, and phase response, at 920 response, of a PWM control loop (apart from the error amplifier), such as shown at 120 in FIG. 1, operating under current mode control. It will be noted that the controller's response is not flat, over the frequency range of interest. Thus the PWM controller design should be taken into account, along with the error amplifier, when designing the complete loop response of the DC-DC control.

Figure 10:
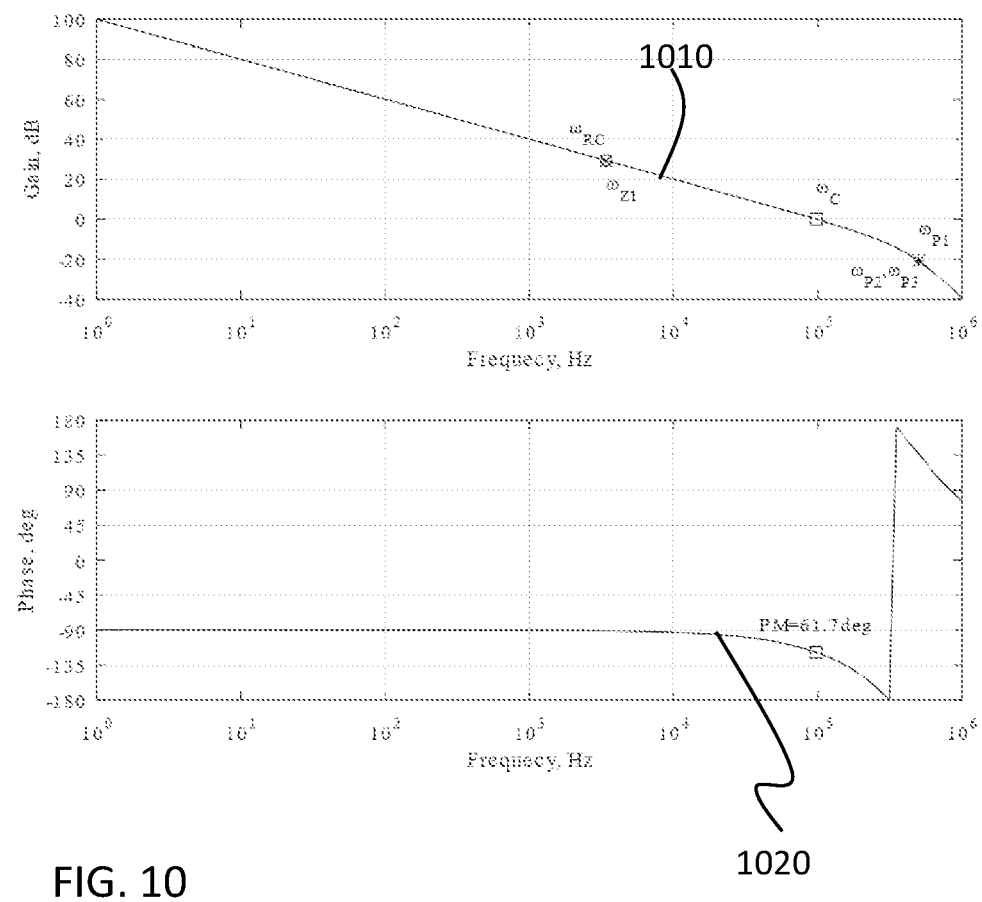
FIG. 10 shows the loop response of a DC-DC converter operating under current mode control and having a type II error amplifier circuit as shown in FIG. 7.

An example of the loop response—that is to say, the error amplifier response multiplied by the rest of the PWM control loop response, is shown in FIG. 10, which depicts at 1010 the gain and at 1020 the phase response.

It will be appreciated from the above discussion, that as used herein, the term "amplified error signal" is to be interpreted broadly to refer to a modified error signal (that is to say, a version of the error signal which is modified in both amplitude and phase), since both the phase and gain of the amplification may be frequency dependant. The term "error amplifier" is to be interpreted accordingly.

From reading the present disclosure, other variations and modifications will be apparent to the skilled person. Such variations and modifications may involve equivalent and other features which are already known in the art of error amplifier circuits for DC-DC converters and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

What is claimed is:

1. An error amplifier circuit for a DC-DC power converter controller and configured to provide an amplified error signal to a switch control circuit, the error amplifier circuit comprising an error amplifier first stage;
   the error amplifier first stage comprising:
      a first stage input terminal for receiving a voltage proportional to an output voltage of a DC-DC converter;
      a first stage output node;
      a first operational transconductance amplifier (OTA) in a first path between the first stage input terminal and the first stage output node and having a first OTA input connected to the first stage input terminal, a second OTA input connectable to a reference signal, and a first OTA output connected to the first stage output node; and
      a second path between the first stage input terminal and the first stage output node and comprising a first amplifier, a second OTA, and a first capacitor coupled together in series, wherein:
         the first amplifier has a first amplifier input and a first amplifier output, wherein the first amplifier input is connected to the first stage input terminal;
         the second OTA has a second OTA output, a third OTA input connected to the first amplifier output, and a fourth OTA input connected to the second OTA output; and
         the first capacitor has a first capacitor terminal and a second capacitor terminal, wherein the first capacitor terminal is connected to the second OTA output, and wherein the second capacitor terminal is connected to the first stage output node.

2. The error amplifier circuit of claim 1, wherein the first stage output node is configured to provide the amplified error signal to the switch control circuit.

3. The error amplifier circuit of claim 1, further comprising an error amplifier second stage, having a second stage input terminal and a second stage output node, wherein the second state input terminal is connected to the first stage output node, and wherein the second stage output node is configured to provide the amplified error signal to the switch control circuit.

4. The error amplifier circuit of claim 3, wherein the error amplifier second stage comprises:
   a third path comprising a third OTA, wherein the third OTA has a third OTA output connected to the second stage output node and a fifth OTA input connected to the first stage output node; and
   a second path in parallel with the first path and comprising a second capacitor, a fourth OTA, and a second amplifier coupled together in series, wherein:
      the second amplifier has a second amplifier input and a second amplifier output, wherein the second amplifier input is connected to the second stage output node;
      the fourth OTA has a fourth OTA output, a sixth OTA input connected to the second amplifier output, and a seventh OTA input connected to the fourth OTA output; and
      the second capacitor has a third capacitor terminal and a fourth capacitor terminal, wherein the third capacitor terminal is connected to the fourth OTA output, and wherein the fourth capacitor terminal is connected to the first stage output node.

5. The error amplifier circuit of claim 1, further comprising an output capacitor connected between the first stage output node and ground.

6. The error amplifier circuit of claim 1, further comprising a resistive voltage divider comprising two resistors connected in series and configured to be connected between an output of the DC-DC converter and ground, the node between the two resistors being connected to the first stage input terminal.

7. The controller for the DC-DC converter and comprising the error amplifier circuit as claimed in claim 1, and the switch control circuit for controlling a power switch of the DC-DC converter, wherein the power switch is configured to selectively transmit power though a switched element.

8. An integrated circuit comprising the controller as claimed in claim 7.

9. The integrated circuit of claim 8, wherein the first capacitor is monolithically integrated in the integrated circuit.

10. The integrated circuit of claim 8, wherein the second capacitor is monolithically integrated in the integrated circuit.

11. The integrated circuit of claim 8, further comprising an output capacitor connected between the first stage output node and ground, wherein the output capacitor is monolithically integrated in the integrated circuit.

12. The integrated circuit of claim 8, further comprising at least one switch driver configured to drive the power switch of the DC-DC converter switch with a pulse width modulated, PWM, (PWM) signal.

13. The DC-DC converter comprising the error amplifier circuit as claimed in claim 1, and further comprising at least one DC-DC converter switch and a switched inductive element.

14. The DC-DC converter comprising the error amplifier circuit as claimed in claim 1, and further comprising at least one DC-DC converter switch and a switched capacitive element.

* * * * *